(12) United States Patent
Terra

(10) Patent No.: US 11,243,141 B2
(45) Date of Patent: Feb. 8, 2022

(54) METHOD AND APPARATUS FOR CHROMATIC DISPERSION MEASUREMENT BASED ON OPTOELECTRONIC OSCILLATIONS

(71) Applicant: Osama Terra, Giza (EG)

(72) Inventor: Osama Terra, Giza (EG)

(73) Assignee: National Institute of Standards, Giza (EG)

( * ) Notice: Subject to any disclaimer, the term of this patent is extended or adjusted under 35 U.S.C. 154(b) by 0 days.

(21) Appl. No.: 16/137,745

(22) Filed: Sep. 21, 2018

(65) Prior Publication Data

US 2020/0096417 A1   Mar. 26, 2020

(51) Int. Cl.
*G01M 11/00*  (2006.01)
*G01N 21/41*  (2006.01)

(52) U.S. Cl.
CPC ........ *G01M 11/338* (2013.01); *G01M 11/332* (2013.01); *G01M 11/335* (2013.01); *G01N 21/41* (2013.01)

(58) Field of Classification Search
CPC ............. G01M 11/333; G01M 11/338; G01M 11/335; G01M 11/319; G01M 11/39; G01M 11/3181; G01M 11/336; G01M 11/3163; H04B 10/073; G01N 21/21; G01N 21/41
See application file for complete search history.

(56) References Cited

U.S. PATENT DOCUMENTS

| | | | |
|---|---|---|---|
| 4,752,125 A * | 6/1988 | Schicketanz | G01M 11/332 356/73.1 |
| 5,033,846 A | 7/1991 | Hernday et al. | |
| 5,406,368 A * | 4/1995 | Horiuchi | G01M 11/333 356/73.1 |
| 6,573,985 B2 * | 6/2003 | Ibukuro | G01M 11/333 356/484 |
| 6,724,468 B2 * | 4/2004 | McAlexander | G01M 11/3181 356/364 |
| 7,796,244 B2 * | 9/2010 | Radic | G01M 11/319 356/483 |

(Continued)

OTHER PUBLICATIONS

K. S. Abedin et al., Journal, (2000), Optics Letters, 299-301, 25, OSA, USA.

(Continued)

*Primary Examiner* — Sang H Nguyen

(57) ABSTRACT

In this invention, a novel technique is introduced to measure chromatic dispersion (CD) in optical fibers. This technique is based on a relatively low-frequency optoelectronic oscillation (OEO) to provide fast, precise and low-cost method for CD measurement that can be implemented easily in commercial instruments. The proposed setup is implemented to measure the CD in normal single mode fibers with lengths of 40 km, 10 km, 1 km. Moreover, it is implemented to measure CD in 400 in of nonzero dispersion shifted fiber to test the system ability to resolve small chromatic delays. The proposed setup can resolve delays less than 0.1 ps/nm (which can be further improved by increasing the oscillation frequency) and measure CD with precision as low as 0.005 ps/nm.km as low as 20 seconds over a wavelength range from 1500 to 1630 nm. Further improvements may be possible by slightly better system design.

10 Claims, 5 Drawing Sheets

(56) References Cited

U.S. PATENT DOCUMENTS

| | | | |
|---|---|---|---|
| 8,135,275 B2* | 3/2012 | Heismann | G01M 11/333 |
| | | | 398/16 |
| 9,625,351 B2* | 4/2017 | Ataie | G01M 11/338 |
| 9,960,843 B2* | 5/2018 | Shiner | H04B 10/0775 |
| 2004/0046964 A1 | 3/2004 | Brendel | |
| 2009/0097036 A1 | 4/2009 | Galle et al. | |
| 2014/0071436 A1* | 3/2014 | Cyr | G01N 21/21 |
| | | | 356/73.1 |
| 2016/0231197 A1* | 8/2016 | Baker | G01M 11/3172 |

OTHER PUBLICATIONS

K. S. Abedin et al., Journal, (2005), Electronics Letters, 469-471, 41-8, IET, USA.

O. Terra, "Chromatic dispersion measurement in optical fibers using optoelectronic oscillations", Optics & Laser Technology, vol. 115, (2019), p. 292-297.

* cited by examiner

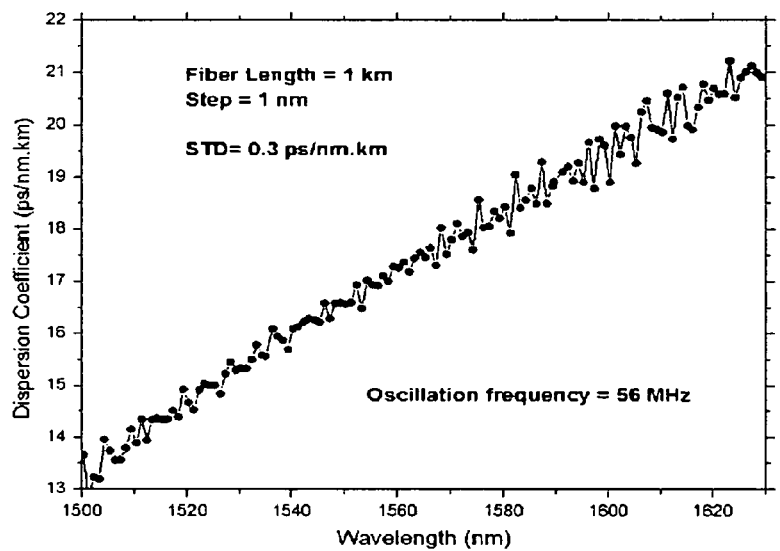
FIG. 5.A.
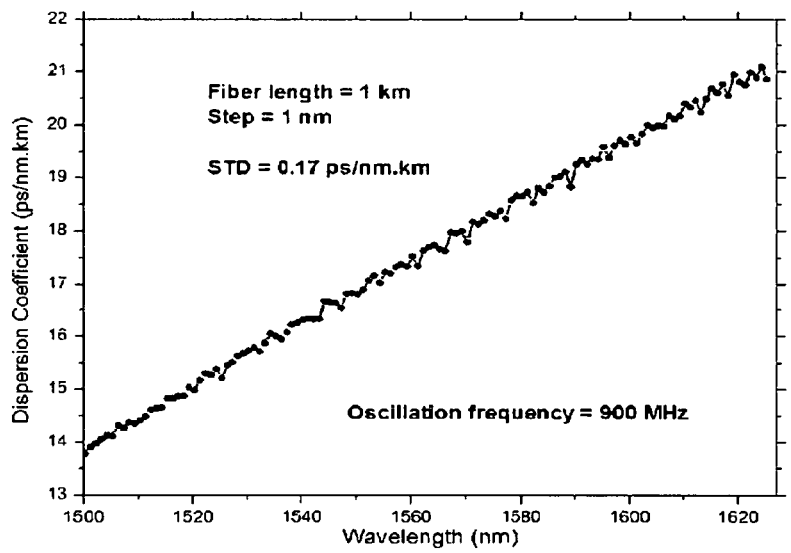
FIG. 5.B.

METHOD AND APPARATUS FOR CHROMATIC DISPERSION MEASUREMENT BASED ON OPTOELECTRONIC OSCILLATIONS

REFERENCE CITED

| U.S. Pat No. 4,752,125 | Jun. 21, 1988 | Schicketanz |
|---|---|---|
| U.S. Pat No. 20040046964 | May 11, 2004 | J. Brendel |
| U.S. Pat No. 20090097036 | Aug.31, 2010 | M. Galle et al. |
| U.S. Pat No. 5,406,368 | Apr. 11, 1995 | Y. Horiuchi et al. |
| U.S. Pat No. 5,033,846 | Jul. 23, 1991 | P.R. Hernday et al. |

OTHER PUBLICATIONS

K. S. Abedin, M. Hyodo, and N. Onodera, "Measurement of the chromatic dispersion of an optical fiber using a Sagnac interferometer employing asymmetric modulation", Opt. Lett., 25, pp. 299-301 (2000).

K. S. Abedin, "Rapid, cost-effective measurement of chromatic dispersion of optical fibre over 1440-1625 nm using Sagnac interferometer", Electronics Letters, vol. 41, No. 8 (2005).

FIELD OF INVENTION

The present invention is related to a novel measurement technique for chromatic dispersion of single mode fibers based on optoelectronic oscillations.

BACKGROUND

Nowadays, transmission bandwidth has been increased in long-haul optical transmission systems from 2.5 Gbit/second to 10 Gbit/second and soon to 40 Gbit/second. Higher bandwidth means that the transmitted optical pulses become near to each other and can overlap if they experience sufficient chromatic dispersion. Therefore, chromatic dispersion measurement of long-haul network is of a great importance to ensure proper operation of such networks.

Tremendous efforts have been spent to find suitable method for chromatic dispersion measurement. Among those methods the Time-of-Flight, the Modulation Phase Shift, and the Interferometric method are recommended by the International Telecommunication Union (ITU-T G.650) and by the International Electro-technical Commission (IEC 60793-1-42:2013).

Although the time-of-flight technique (U.S. Pat. No. 4,752,125 by Schicketanz) is simple to implement, it has low accuracy and is not suitable to resolve small chromatic dispersions.

The modulation phase shift technique became an industry standard and covered by several patents (references: U.S. Pat. No. 5,033,846 by Hernday et al., U.S. Pat. No. 5,406, 368 by Horiuci et al.). This technique has better accuracy than the time-of-flight technique, however, it is time consuming and expensive to implement since it needs an expensive network analyzer. An example of a commercial device that implements this technique is the Agilent 86038C.

The best chromatic dispersion measurement accuracy can be obtained from the Interferometric technique (U.S. Pat. No. 7,787,12 by Michael Galle); however, it can only measure short fibers of lengths in the order of one meter.

Further techniques have been investigated to provide fast operation and higher accuracies with less complex system. A ring-type Sagnac interferometer has been proposed to measure chromatic dispersion cost-effectively (K. S. Abedin et al. Opt. Lett., (2000)); however, this technique is time-consuming due to the time required for the analysis of the acquired fringes at every wavelength. Although further improvement has been made to this technique to make the measurement time considerably smaller (K. S. Abedin, Electronics Letters, (2005)), the chromatic dispersion measurement through voltage change degrades its accuracy and makes the traceability to the SI unit of time not easily possible.

Therefore, a need still exists for a technique that is: precise, fast, low-cost and traceable to the SI unit of time for chromatic dispersion measurement.

BRIEF SUMMERY OF THE INVENTION

The Present invention comprises a novel technique for chromatic dispersion measurement. This technique is based on creating a relatively low-frequency optoelectronic oscillation (OEO), in which the electro-to-optic converter is a tunable laser source. In order to measure chromatic dispersion, the tunable laser is swept over the wavelengths range of interest, while change in the oscillation frequency of the optoelectronic oscillator is measured. Consequently, the chromatic dispersion can be calculated from the change in oscillation frequency and the change in wavelength.

BRIEF DESCRIPTION OF THE DRAWINGS embodiments of the present invention are illustrated as an example and are not limited by the figures of the accompanying drawings, in which like references may indicate similar elements and in which:

FIG. 5A depicts the chromatic dispersion measurement of 1 km fiber with 1 nm scanning steps over wavelength scanning range from 1500-1630 nm at oscillation frequency of 56 MHz. (STD: standard deviation).

FIG. 5B depicts the chromatic dispersion measurement of 1 km fiber with 1 nm scanning steps over wavelength scanning range from 1500-1630 nm at oscillation frequency of 900 MHz. (STD: standard deviation).

DETAILED DESCRIPTION OF THE INVENTION

The terminology used herein is for the purpose of describing particular embodiments only and is not intended to be limiting of the invention.

Novel chromatic dispersion measurement technique is discussed herein. This technique is based on the optoelectronic oscillation (OEO).

Figure 1:
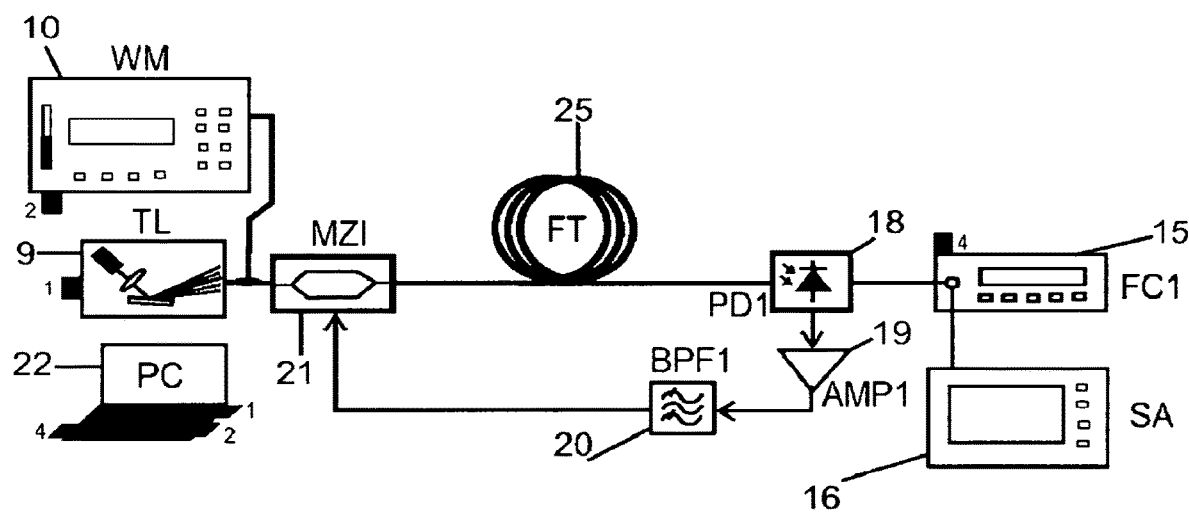
FIG. 1 depicts the chromatic dispersion measurement setup using optoelectronic oscillation (OEO).

The basic oscillator comprises a tunable laser (TL) (1), an intensity modulator (MZI) (1), fiber under test (FT) (3), a photodetector (PD) (4), an amplifier (AMP) (5), a filter (BPF) (6), power splitter (7) and a frequency counter (FC) (8) which are connected as shown in FIG. 1).

The RF amplifier (5) should provide sufficient gain to compensate the loss inside the loop and therefore starting the oscillation. The basic condition for the OEO oscillation is that the accumulated phase around the loop in the optical and RF part to be integer multiples of $2\pi$.

The oscillation frequency of the OEO cavity can be described by the following equation:

$$f_q = qf = \frac{q}{\tau} = \frac{q}{\tau_F + \tau_{sys}}, \tau_f = \frac{nL}{c_o} \quad (1)$$

Where, $\tau_F$ is the time-of-flight of the light inside the fiber under test, $\tau$, $\tau_{sys}$ are the delays inside the whole cavity and inside the measurement system respectively, L is the length of the fiber under test, q is the oscillation mode number, f is the cavity fundamental oscillation frequency, $c_o$: the speed of light in vacuum (299792458 m/s), n: the refractive index of the fiber under test which is 1.4682 at 1550 nm.

The chromatic dispersion coefficient (D) is defined as the change in the time-of-flight of the light inside the fiber under test ($d\tau_F$) as its wavelength changes by ($d\lambda$):

$$D(\text{ps/nm}\cdot\text{km}) = \frac{d\tau_F}{d\lambda L} = \frac{q df_q(\text{Hz})(10^{12})}{d\lambda (\text{nm}) L(\text{km}) f_q^2 (\text{Hz}^2)} \quad (2)$$

Therefore, by changing the wavelength of the tunable laser by ($d\lambda$) while measuring the change in the OEO oscillation frequency ($df_q$), D can be calculated from equation (2).

Therefore, by changing the wavelength of the tunable laser while measuring the change in the oscillation frequency of the OEO, D can be calculated from equation (2).

Figure 2:
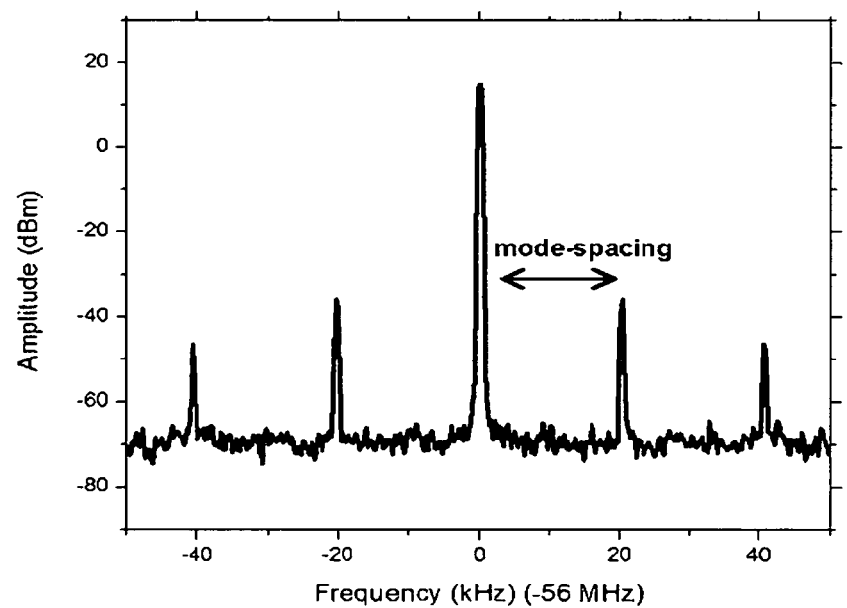
FIG. 2 depicts the spectrum of Optoelectronic oscillation near 56 MHz with sidebands (Fiber under test length=10 km).
Figure 3:
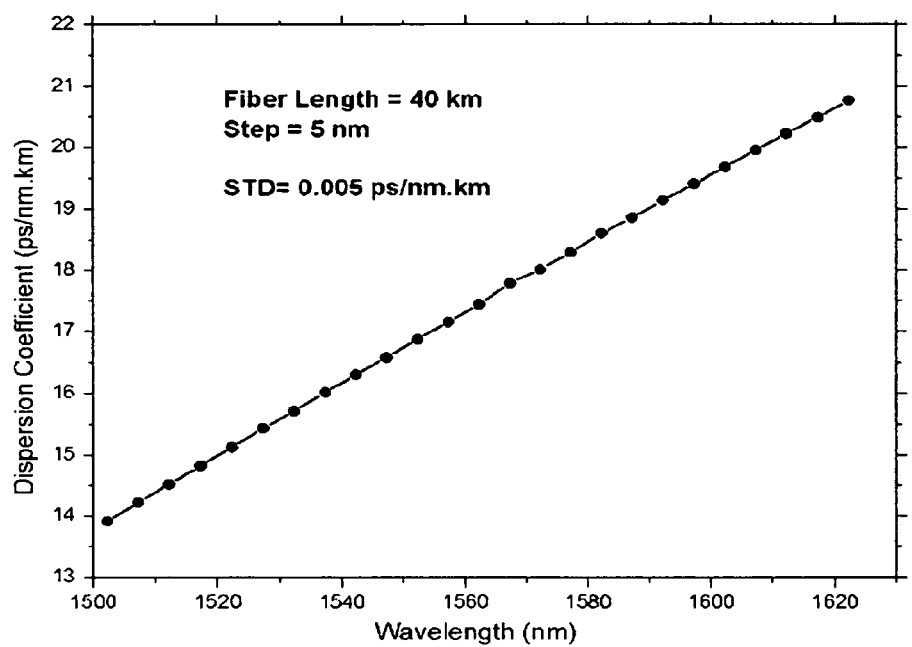
FIG. 3 depicts the chromatic dispersion measurement results at 5 nm scanning steps over wavelength range 1500-1630 nm for normal single mode fiber of length of 40 km STD: standard deviation, Oscillation frequency=56 MHz.

The setup shown in FIG. 2 is constructed to measure chromatic dispersion. The chromatic dispersion measuring oscillator comprises of a tunable laser (TL) (9), a Mach-Zehnder Intensity modulator (MZI) (21), Photodetector (PD1) (18), an amplifier (AMP1) (19), bandpass filter (BPF1) (20), frequency counter (FC1) (15), fiber under test (25) and a wavemeter (WM) (10).

A RF spectrum analyzer (SA) (16) is used to characterize the beat resulting from the oscillation. A computer (22) is used to control the sweeping of the tunable laser and take reading from the wavemeters and the frequency counters at each wavelength.

The light from the tunable laser (9) is directed to the MZI (21). The intensity modulated light after the MZI (21) is sent through the fiber under test and falls on the photodetector PD1 (18). The RF output from the photodetector PD1 (18) is amplified by the RF amplifier (AMP1) (19) to compensate the loses and filtered at the required RF frequency using the RF filter (BPF1) (20). The output from the RF filter is connected again to the intensity modulator (21) to form the oscillating loop. After the oscillation takes place, the frequency counter (FC1) (15) is used to measure the oscillation frequency change as wavelength of the tunable laser (TL) (9) changes.

The RF spectrum analyzer (16) is used to characterize the oscillation beat and to measure the fundamental frequency by measuring the mode-spacing as shown in FIG. (3).

The exact wavelength of the tunable laser is measured continuously using an accurate wavemeter (10).

Figure 4:
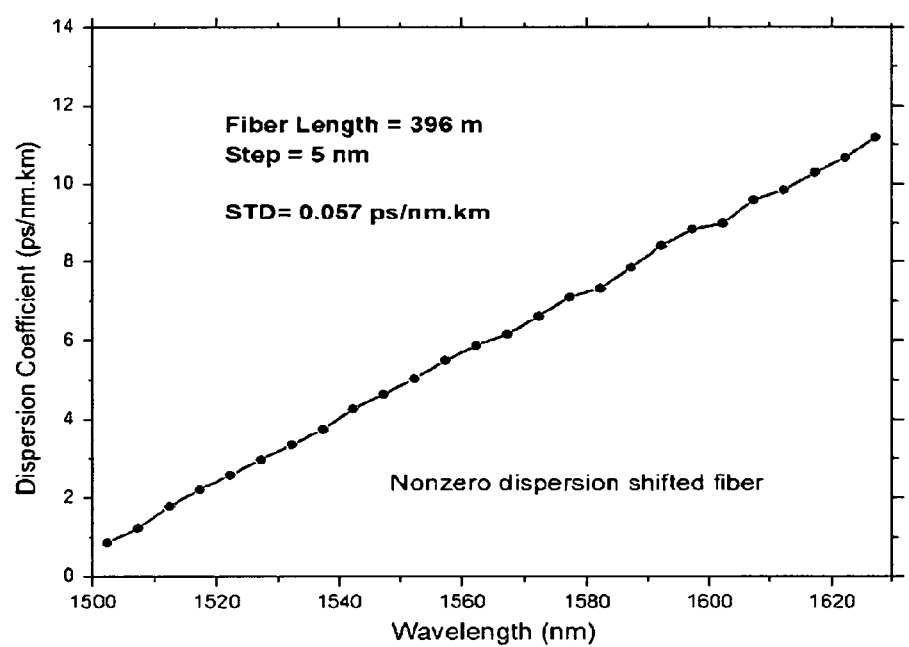
FIG. 4 depicts the chromatic dispersion measurement results at 5 nm scanning steps over wavelength range 1500-1630 nm for nonzero dispersion shifted fiber of length of 400 m STD: standard deviation, Oscillation frequency=56 MHz.

According to equation 2, the oscillation mode number has to be determined for each fiber under test (25). This number can be determined easily from the RF spectrum of the optoelectronic oscillation by dividing the oscillation frequency by the spacing between two consecutive peaks which represents the fundamental frequency, see FIG. 4.

The setup in FIG. 2 is verified for measuring the chromatic dispersion of 40 km of normal single mode fiber and 400 m of nonzero dispersion shifted fiber. The measurement is performed by sweeping the tunable laser over the wavelengths from 1500 nm to 1630 nm in steps of 5 nm, while measuring the oscillation frequency change using a frequency counter. The laser wavelength during sweeping is measured using accurate wavemeter. The chromatic dispersion is calculated from equation (2) and the measurement results are shown in FIG. 5 (40 km) and 400 m (FIG. 6).

For long fibers, the mode number q is large enough to resolve CD with precision as low as 0.005 ps/nm.km in step of 5 nm (0.018 ps/nm.km in step of 1 nm) with such relatively low oscillation frequency (56 MHz). However, for short fibers, higher oscillation frequencies are required to reach comparable mode number and consequently reach similar precision. For example, for 40 km fiber, q≈11000 at 56 MHz; on the other hand, for 1 km fiber, q≈285 at 56 MHz, while it is q≈4583 at 900 MHz. Therefore, in order to enhance the measurement precision for short fibers, higher frequencies is required. FIG. 7 shows a test measurement made on 1 km fiber at two oscillation frequencies, namely, 56 MHz and 900 MHz. The test shows that at oscillation frequency of 900 MHz the measurement precision is better than that of measurement at 56 MHz.

When comparing the proposed setup with the best available commercial measuring device currently available (ex. Agilent 86037C), optoelectronic oscillation setup is 3 times faster than Agilent since it measures chromatic dispersion from 1500 to 1630 nm in 5 nm steps in 20 seconds, while Agilent measures it in around 1 minute. The measurement resolution for Agilent system reported to be 0.1 ps/nm which is similar to the proposed setup herein which is 0.09 ps/nm (obtained from the 400 m nonzero dispersion shifted fiber measurement) for the low modulation frequency of 56 MHz. However, by increasing the oscillation frequency the resolution is expected to be much better depending on the frequency selected. The price of the OEO system should be much lower than the Agilent system, since the Agilent system employ a vector analyzer to measure the phase change which is more expensive than the component of the proposed setup herein. The proposed setup can be reduced to simple scheme (like the setup in FIG. 1) if the fiber is placed in a temperature controlled chamber or the measurement is made in relatively stable environment (which is not considered in any setup else). The spectrum analyzer is needed only once at manufacturing process to measure system frequency.

What is claimed is:

1. A method for chromatic dispersion measurement using an optoelectronic oscillator; wherein, the wavelength of a tunable laser is changed; wherein, the change in the frequency of the optoelectronic oscillator as a result of the wavelength change is measured using a frequency counter; wherein, the optoelectronic oscillator comprises an optical intensity modulator; an optical fiber which chromatic dispersion is measured; a photodetector; an electrical amplifier; and an electrical filter; wherein, the components of the optoelectronic oscillator is connected to form a loop by connecting the output of the electrical filter by the electrical input of the optical intensity modulator.

2. The method of claim 1, wherein the output from the tunable laser is modulated using the optical intensity modulator, wherein the optical modulated output from the intensity modulator is directed to the optical fiber under measurement, wherein the output from the fiber under measurement is connected to the photodetector, wherein the photodetector converts the optical modulated signal to an electrical modulated signal, wherein the electrical modulated signal is amplified by the amplifier, wherein the amplified modulated signal is filtered using the electric filter, wherein the filtered, modulated, and amplified signal is connected to the electrical input of the optical intensity modulator, thereby forming the optoelectronic oscillation loop.

3. The method of claim 1, wherein the frequency counter is connected to the optoelectronic oscillator.

4. The method of claim 1, wherein the laser power and the power of the electrical amplifier is increased until the optoelectronic oscillation takes place.

5. The method of claim 1, wherein the wavelength of the tunable laser is swept while measuring the change in the optoelectronic oscillation frequency using the frequency counter.

6. The method of claim 1, wherein the tunable laser contains a mean for wavelength measurement during sweeping.

7. The method of claim 1, wherein the length of the fiber under measurement ranges from 400 m to 100 km.

8. The method of claim 1, wherein the oscillation mode spacing is measured using a spectrum analyzer.

9. The method of claim 1, wherein the filter center frequency ranges from 1 MHz to 20 GHz.

10. The method of claim 1, wherein the sweeping of the tunable laser, the wavelength measurement and the frequency counter measurement is automated an automation system.

* * * * *